United States Patent
Charache et al.

[11] Patent Number: 6,057,506
[45] Date of Patent: May 2, 2000

[54] VARIABLE CURRENT-VOLTAGE TPV DEVICE FOR USE IN A THERMOPHOTOVOLTAIC ENERGY CONVERSION SYSTEM

[75] Inventors: Greg W. Charache; Paul F. Baldasaro, both of Clifton Park; Brian C. Campbell, Scotia, all of N.Y.

[73] Assignee: The United States of America as represented by the United States Department of Energy, Washington, D.C.

[21] Appl. No.: 09/275,263

[22] Filed: Mar. 23, 1999

Related U.S. Application Data
[60] Provisional application No. 60/078,964, Mar. 23, 1998.

[51] Int. Cl.$^7$ .................................................. H01L 35/04
[52] U.S. Cl. ............................................ 136/253; 136/206
[58] Field of Search .................... 136/244, 253, 136/206, 249

[56] References Cited

U.S. PATENT DOCUMENTS

| | | | |
|---|---|---|---|
| 4,754,544 | 7/1988 | Hanak | 437/2 |
| 5,009,719 | 4/1991 | Yoshida | 136/249 |
| 5,266,125 | 11/1993 | Rand et al. . | |
| 5,403,405 | 4/1995 | Fraas et al. | 136/253 |
| 5,407,491 | 4/1995 | Freundlich et al. | 136/249 |
| 5,437,734 | 8/1995 | Matsushita et al. | 136/249 |
| 5,800,630 | 9/1998 | Vilela et al. . | |
| 5,853,497 | 12/1998 | Lillington et al. | 136/249 |

OTHER PUBLICATIONS

D.M. Wilt et al., Monolithically Interconnected InGaAs TPV Module Developement, 25th PVSC, May 13–17, pp. 43–48, 1996.
G.W. Charache et al., Infrared Materials for Thermophotovoltaic Applications, 39th Electronics Materials Conf., pp. 1–21, Jun. 1997.
H.S. Rauschenbach, Solar Cell Design Handbook, Van Nostrand Reinhold Company, p. 161, 1980.
D.M. Wilt et al., Monolithically Interconnected InGAAs TPV Module Development, 25th PVSC, May 13–17, 1996, 43–48.
G.W. Charache et al., Infrared Material for Thermophotovoltaic Applicaton, 39th Electronics Materials Conf., Jun. 1997.
S. Wojtczuk et al., P/N In(Al) Multijunction Laser Power Converters, 8th SPRAT Conf., 1994, 363–371.
S.B. Spitzer et al., Monolithic Series–Connected Gallium Arsenide Converter Development, 22nd IEEE Conf., 1991, 142–146.
J.A. Rand et al., Development of Monolithically Integrated Silicon–Film Modules, AIP Conf. Proc., 52 (1992), pp. 52–57.
K.W. Mitchell, High Efficiency Concentrator Cells, $12^{th}$ IEEE PVSC, 142 (1981), pp. 142–146.
J.C. Evans et al., Planar Multijunction High Voltage Solar Cells, IEEE PVSC, 58, pp. 58–62.
J.M. McGee et al., Emitter Wrap–Through Solar Cell, 23rd IEEE PVSC, 265 (1993), pp. 265–270.
R. W. McClelland et al., High Voltage, Monolithically Integrated GaAs Thin Film Solar Submodules, 21st IEEE PVSC, May 1990.
P.G. Borden et al., A monolithically Series–Interconnected AlGaAs/GaAs Solar Cell Array, $11^{th}$ IEEE PVSC, (1980), pp. 554–562.

*Primary Examiner*—Nam Nguyen
*Assistant Examiner*—Michael C. Miggins
*Attorney, Agent, or Firm*—Virginia B. Caress; William R. Moser; Paul A. Gottlieb

[57] ABSTRACT

A front-side or back-side illuminated variable current-voltage thermophotovoltaic device comprises a support substrate; isolation layers disposed on the support substrate; a plurality of cells disposed on the isolation layers, each of the cells including a base layer and an emitter layer; an insulating member disposed between each of the cells configured to isolate each cell from adjacent cells; an ohmic contact configured to connect each cell to another cell in series; and a spectral control device disposed on top of the cells and/or on the bottom surface of the support substrate.

23 Claims, 6 Drawing Sheets

INFRARED RADIATION

INFRARED RADIATION

VARIABLE CURRENT-VOLTAGE TPV DEVICE FOR USE IN A THERMOPHOTOVOLTAIC ENERGY CONVERSION SYSTEM

This application claims the benefit of U.S. Provisional Application No. 60/078,964 filed on Mar.23, 1998.

FIELD OF THE INVENTION

This invention relates to the field of thermophotovoltaic (TPV) direct energy conversion. In particular, this invention embodies a novel TPV device design that has integrated series connections to form variable current-voltage devices.

BACKGROUND OF THE INVENTION

Thermophotovoltaic (TPV) energy systems convert thermal energy to electric power using the same principle of operation as solar cells. In particular, a heat source radiatively emits photons which are incident on a semiconductor TPV cell. Photons with an energy greater than the semiconductor bandgap ($E_g$) excite electrons from the valence band to the conduction band (interband transition). The resultant electron-hole-pairs (ehp) are then collected by metal contacts which can power an electrical load. Photons with energy less than $E_g$ are parasitically absorbed as heat. In order to increase the efficiency of a TPV energy system, some form of spectral control is also employed to reflect the photons with energy less than $E_g$ back to the heat source (radiator) before they are parasitically absorbed.

Due to the low bandgaps (0.4–0.8 eV) and high intensity photon generation rate ($>10^{23} cm^{-3} s^{-1}$) incident on TPV cells, conventional devices (1 $cm^2$) produce high currents ($>4 A/cm^2$) and low voltages ($<0.5$ V). Thus, a large number of series interconnects are required for large power module development. In TPV module development, to-date, series interconnections have been painstakingly made using conventional solar cell paneling techniques. However, a number of novel series interconnect techniques have been made using thin-film microelectronic processing techniques that enable simpler solar cell module fabrication. Similar techniques can also be applied to TPV devices.

These thin film techniques allow the ability to design high-voltage, low-current devices which minimize the number of TPV module series interconnections. In addition, variable current-voltage devices can also be fabricated, which is desirable for TPV applications due to potential temperature and photon-flux variations present within a TPV generator.

OBJECT AND SUMMARY OF THE INVENTION

It is an object of the present invention to provide a TPV device with single-side p and n connections.

It is another object of the present invention to provide a TPV device that incorporates a front-side or back-side spectral control, or both.

It is still another object of the present invention to provide a TPV device that reduces front grid series resistance.

It is still another object of the present invention to provide a TPV device with integrated series connections.

It is still another object of the present invention to provide a TPV device with reduced inactive areas that account for less than 5% of the total inactive and active areas.

It is still another object of the present invention to provide a TPV device that provides variable current-voltage output for a flexible generator design.

It is still another object of the present invention to provide a TPV device that is ultra thin, less than 10 microns.

It is still another object of the present invention to provide a TPV device that uses thin-film microelectronic processing techniques that enable simpler TPV cell module fabrication.

In summary, the present invention provides a thermophotovoltaic device comprising a single crystal substrate, e.g. GaSb; isolation layers disposed on the substrate, e.g. AlGaAsSb; a base layer, e.g. InGaAsSb, disposed on the isolation layers; an emitter layer, e.g. InGaAsSb, disposed on the base layer; and wherein the emitter layer, the base layer and the isolation layers are single crystal layers.

The present invention also provides a front-side or back-side illuminated thermophotovoltaic device comprising a support substrate; optional graded layers disposed on the substrate; isolation layers disposed on the optional graded layers or the support substrate; a plurality of cells disposed on the isolation layers, each of the cells including a base layer and an emitter layer; an insulating member disposed between each of the cells configured to isolate each cell from the adjacent cells; an ohmic contact configured to connect each cell to another cell in series; a spectral control device disposed on top of the cells or the bottom surface of the support substrate; and an optional reflector disposed on the front-side or back-side of the device.

The present invention further provides a front-side or back-side illuminated ultra-thin thermophotovoltaic device comprising a single or non-single crystal support substrate; a plurality of cells disposed on the support substrate, each of said cells including a single or non-single crystal base layer and a single or non-single crystal emitter layer disposed on the base layer; an insulating member disposed between each of the cells configured to isolate each cell from adjacent cells; an ohmic contact configured to connect each cell to another cell in series; an optional spectral control device disposed on top of the cells or on the bottom surface of the substrate; and an optional reflector disposed on the front-side or back-side of the device.

The present invention further provides a method for fabricating a thermophotovoltaic device, comprising providing a support substrate; epitaxially growing active areas (comprising base and emitter layers), optional graded layers and isolation layers on the support substrate; etching the base and emitter layers down to the isolation layers, if used, or the substrate to divide the active areas into individual cells; defining base contact areas in each cell and etching the emitter layer down to the base layer; depositing an insulating layer over the entire top side of the device; defining contact hole areas above both the base and emitter areas and etching the insulating layer down to the base layer; and defining top-side metal areas and performing a metal lift-off process to define series interconnections.

These and other objects of the present invention will become apparent from the following detailed description.

DETAILED DESCRIPTION OF THE INVENTION

Figure 1:
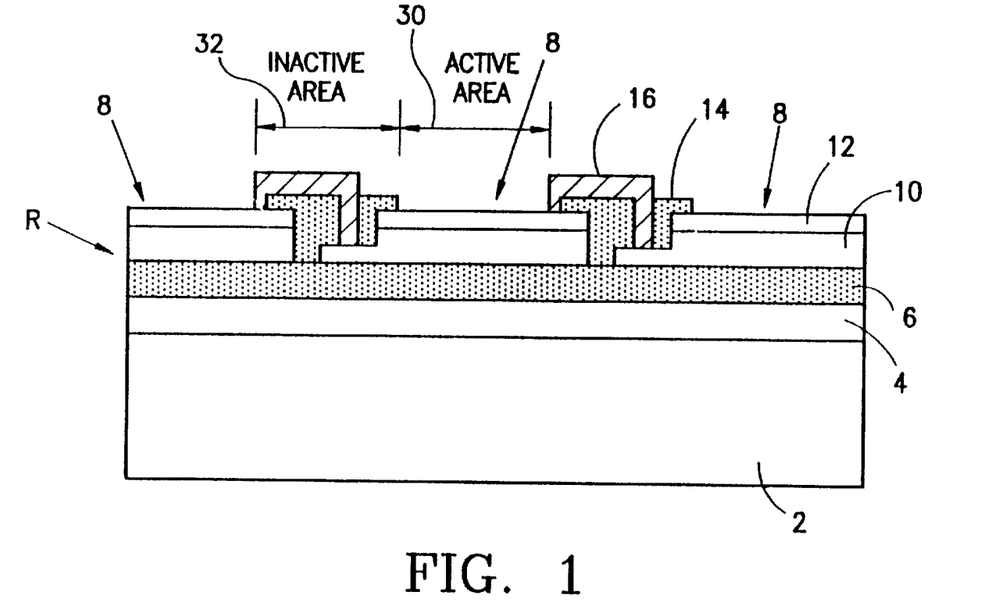
FIG. 1 is a schematic diagram in cross-section of a basic, variable current-voltage TPV device that illustrates the thin film series interconnect concept.

A variable current-voltage TPV device R made in accordance with the present invention is disclosed schematically in cross-section in FIG. 1. The device R includes a support substrate 2 which can be made from conducting materials, such as GaSb, Si, InAs; semi-insulating materials, such as InP and GaAs; and insulating materials such as $Al_2O_3$ and glass. The substrate 2 can be a single or non-single crystal material.

When single crystal materials are used, optional graded layers 4 are disposed on top of the support substrate 2. The graded layers 4 are epitaxially grown on the single crystal support substrate 2 and are made from materials such as InGaAs, InGaSb, AlGaAsSb, AlInAsSb, InPAs, and AlInSb. The graded layers act as a defect buffer layer.

When single crystal materials are used, the substrate isolation layers 6 are disposed on top of the graded layers 4, if used, or the substrate 2. The isolation layers 6 are epitaxially grown on the graded layers 4, if used, or on the support substrate 2. The isolation layers can be either wide bandgap epitaxial layers such as, AlInPAs, AlInGaAs, AlInAsSb, AlGaInSb, or AlGaAsSb; or heterojunction barriers comprising any two materials selected from AlGaInSb, AlInPAs, AlInAsSb, AlInGaAs or AlGaAsSb (wherein two materials may mean using the same material, e.g. AlGaInSb;AlGaInSb, with two different doping levels).

A plurality of cells 8 are disposed on the isolation layers 6, if present, or on the support substrate 2. Each cell 8 includes a base 10 and an emitter 12. The polarity (n or p doping) of the emitter and base layers are arbitrary. For example the emitter may be n-type and the base p-type, or vice versa. The base 10 is epitaxially grown on the isolation layers 6, if present, or on the support substrate 2 and can be made of InGaAs, InGaAsSb, InPAs, InGaSb, GaSb, or InAsPSb. The emitter 12 is epitaxially grown on the base 10 and is made of InGaAs, InGaAsSb, InPAs, InGaSb, GaSb, or InAsPSb.

Each cell 8 is separated from the adjacent cell by a dielectric isolating material 14, which can be made of materials such as $Si_3N_4$ or $SiO_2$.

Monolithic metal contact 16 connects the base of one cell to the emitter of the adjacent cell in a series connection. The metal contacts 16 can be made of materials such as, gold or silver-based metalizations.

Figure 2:
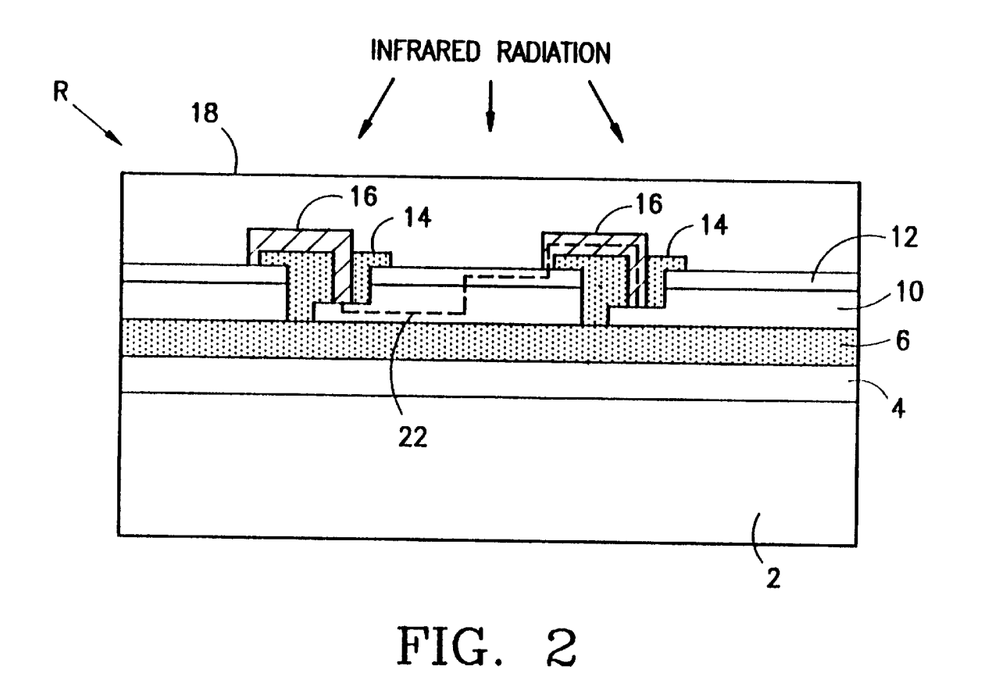
FIG. 2 is a schematic diagram in cross-section of a variable current-voltage TPV device that incorporates front-surface spectral control and front-side illumination.

Spectral control is added to the device R to recuperate below-bandgap photons. Referring to FIG. 2, a front-surface spectral control device 18 is disposed on top of the emitter layer 12 where the photons are incident from the top of the device. The spectral control device 18 may be glued or directly deposited onto the device. Spectral control may be provided by an interference filter made of materials such as $ZnSe/ThF_2$.

Figure 3:
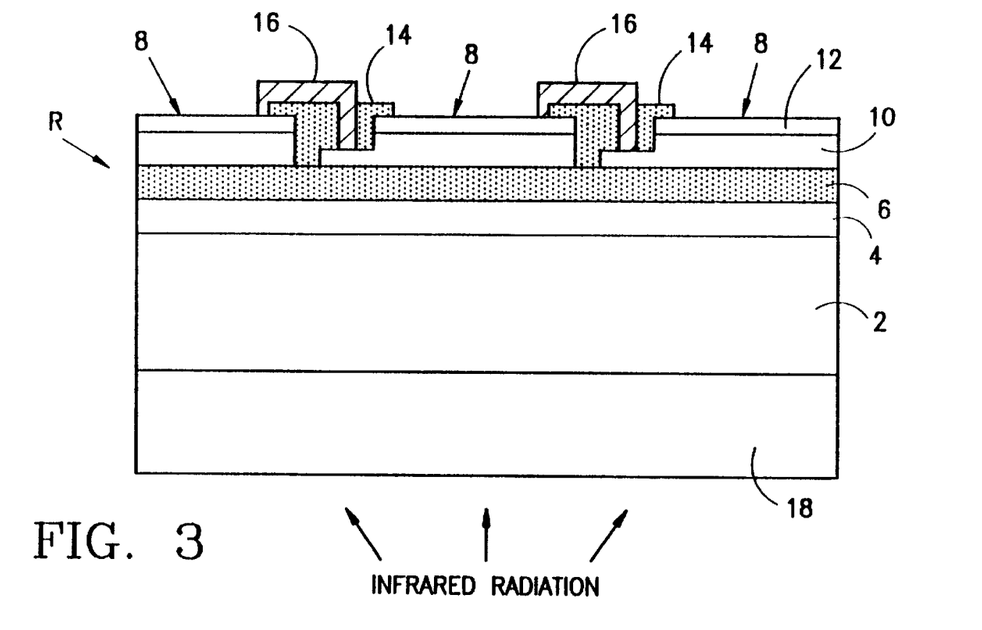
FIG. 3 is a schematic diagram in cross-section of a variable current-voltage TPV device that incorporates back-surface spectral control and back-side illumination.

In another embodiment of the device R, where the photons are incident from the bottom of the device, the spectral control device 18 is disposed at the bottom surface of the support substrate 2, as best shown in FIG. 3. In this embodiment, the support substrate bandgap must be large enough to prevent absorption of above-bandgap photons.

Figure 4:
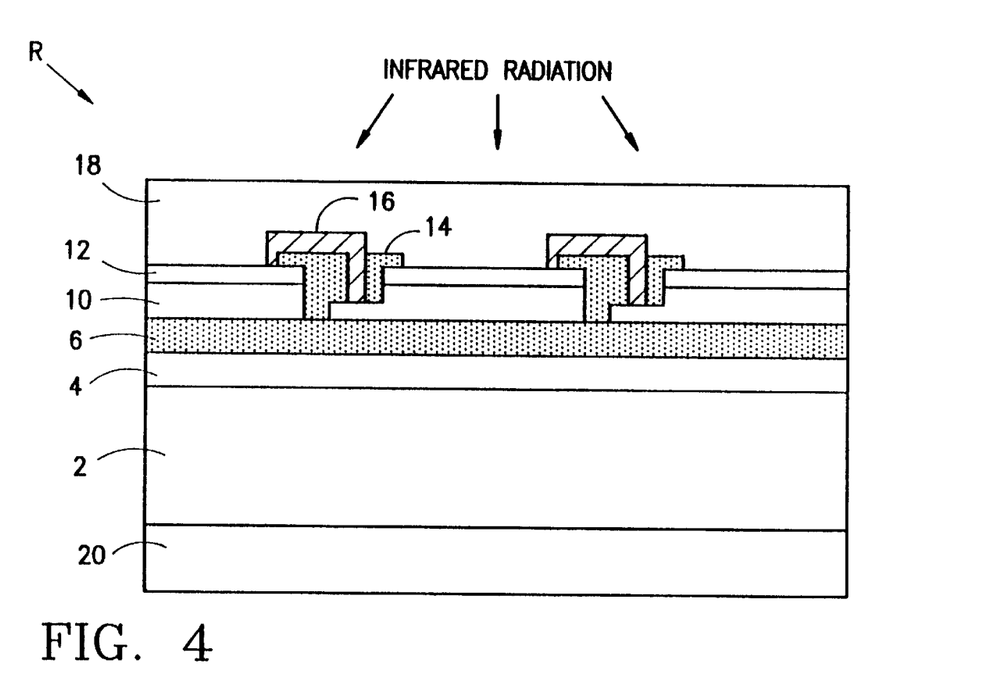
FIG. 4 is a schematic diagram in cross-section of a variable current-voltage TPV device that incorporates a back surface reflector, front-surface spectral control, and front-side illumination.

In another embodiment of the device R, both a front-surface filter (spectral control device) 18, and a back-surface reflector 20 are provided for spectral control. In the embodiment shown in FIG. 4, the photons are incident from the top of the device. The back-surface reflector 20 does not have to form an ohmic contact and substrate 2 may be of any bandgap. The reflector 20 may be made of materials such as, gold or silver-based metalizations.

Figure 5:
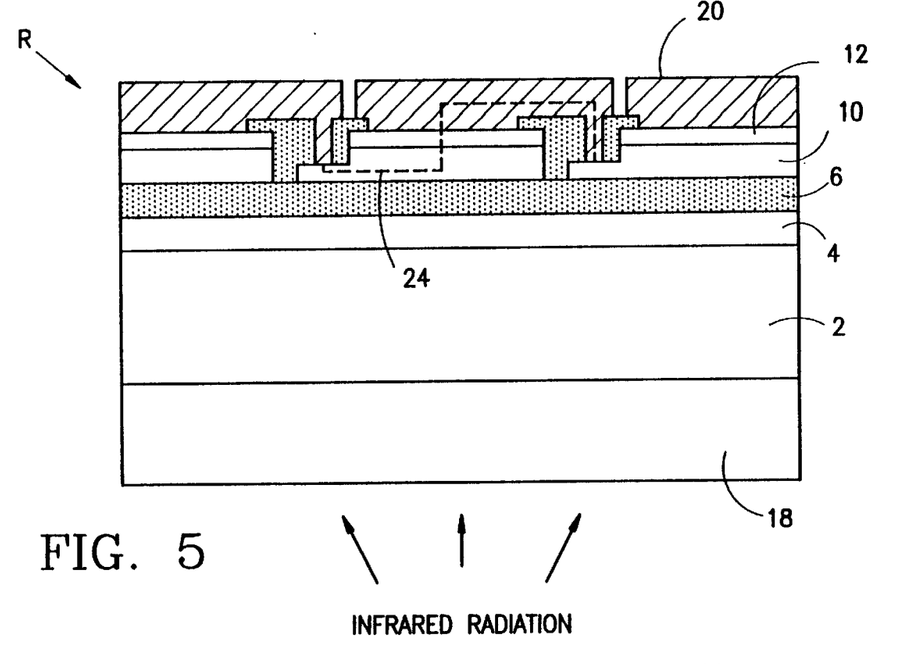
FIG. 5 is a schematic diagram in cross-section of a variable current-voltage TPV device that incorporates spectral control on the back surface facing the back-side illumination, and a back-surface reflector on top of the cell.

In the embodiment shown in FIG. 5, the back-surface reflector 20 is disposed on top of the cells and also functions as an ohmic contact provided by the metal contact 16 shown on the other embodiments. In addition, a spectral control device is disposed at the bottom of the substrate 2. The bandgap of the supporting substrate 2 must be large enough to prevent absorption of the above-bandgap photons. In this embodiment, the photons are incident from the back-side of the device.

Figure 6:
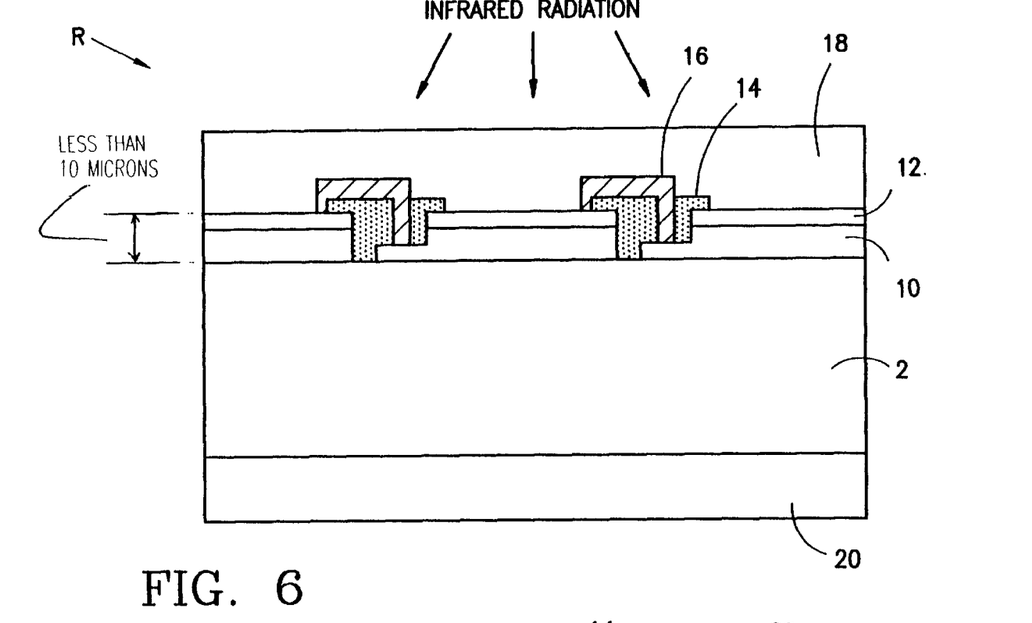
FIGS. 6 and 7 are schematic diagrams in cross-section of an ultra-thin variable current-voltage TPV device made in accordance with the present invention.
Figure 7:
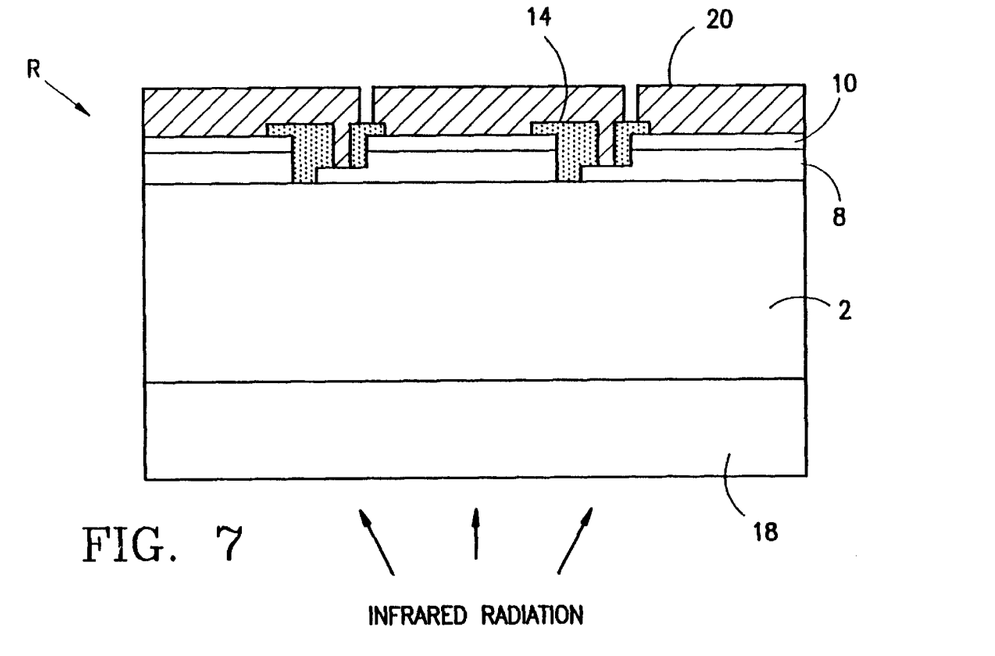

In the embodiments of the device R, shown in FIGS. 6 and 7, the emitter 12 and base 10 layers are made ultra-thin, for example, about less than 10 microns total thickness for both together. These emitter and base layers are either directly deposited on a non-single crystal insulating substrate 2 or transferred from a single crystal substrate (by a method described in U.S. Pat. No. 5,626,687, incorporated herein by reference) to the support substrate that is insulating or semi-insulating and can be a single- or non-single crystal layer. In the case of direct deposition on a non-single crystal insulating substrate, the emitter and base layers are non-single crystal. In the case of transferring from a single crystal substrate, the emitter and base layers are single crystal. Either or both front-surface and back-surface spectral control are utilized. The graded layers 4 and isolation layers 6 are omitted.

In order to maximize the active area 30 (see FIG. 1) of the device R, the inactive area 32 utilized for the series interconnections should be minimized. Assuming that the smallest definable dimension of the photolithographic process used to separate the individual cells 8 is 1 $\mu$m (see FIG. 8B), then a total interconnect of 5 $\mu$m is possible. This, however, will also be impacted by the minimum attainable contact resistance of the metal-semiconductor contact. This constraint will be material specific. The inactive area should be less than 5% of the sum of both the inactive and active areas.

The maximum size of the individual cells will be limited by the series resistance power loss of the emitter and base regions. For front-side illuminated devices and back-side illuminated devices that do not incorporate a back-surface reflector, current flow is lateral in both the emitter and the base, as generally shown by the phantom line 22 in FIG. 2. For these configurations, the power loss is dominated by both the emitter and base regions.

For a back-side illuminated device that incorporates a back-surface reflector that also functions as the ohmic contact, the current flow is only lateral in the base region, as generally indicated by the phantom line 24 in FIG. 5. Thus, for this configuration, the power loss is only dominated by the base region.

In a preferred embodiment of the device R, the substrate 2 is made of GaSb, the emitter and base are made of InGaAsSb, and the isolation layers, AlGaAsSb. All are single crystal layers. The graded layers 4 are not provided.

A fabrication sequence in accordance with the present invention for the variable current-voltage TPV device R is as follows.

Figure 8A:
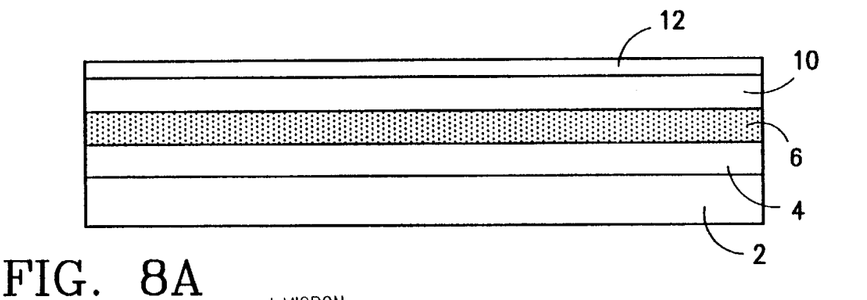
FIGS. 8A–8H show a variable current-voltage TPV device fabrication sequence.

The active device layers (base 10 and emitter 12), optional graded layers 4 and the isolation layers 6 are epitaxially grown on a suitable semi-conductor substrate 2 as best shown in FIG. 8A. The insulating support substrate 2 must be used when the isolation layers are not used.

Figure 8B:
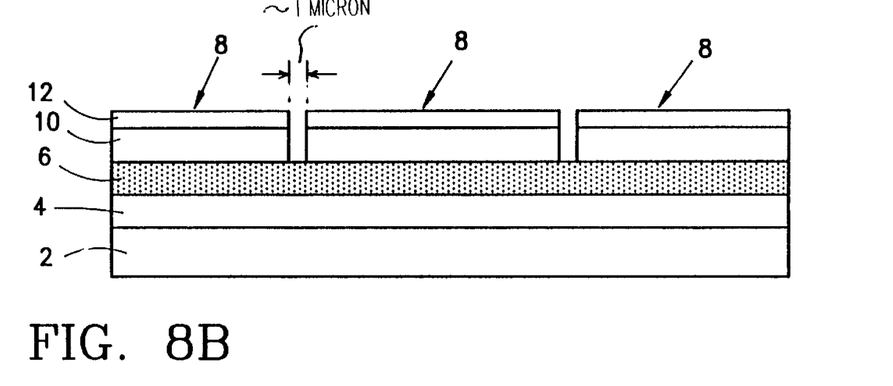

A first mask (not shown) is used to photolithographically define the individual cell areas 8 and etch the active layers down to the substrate 2 or to the optional isolation layers 6, if used, as best shown in FIG. 8B.

Figure 8C:
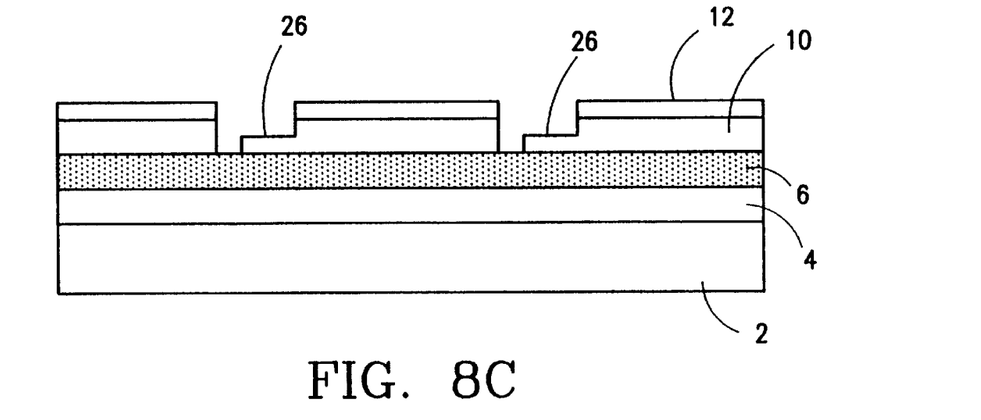
Figure 8D:
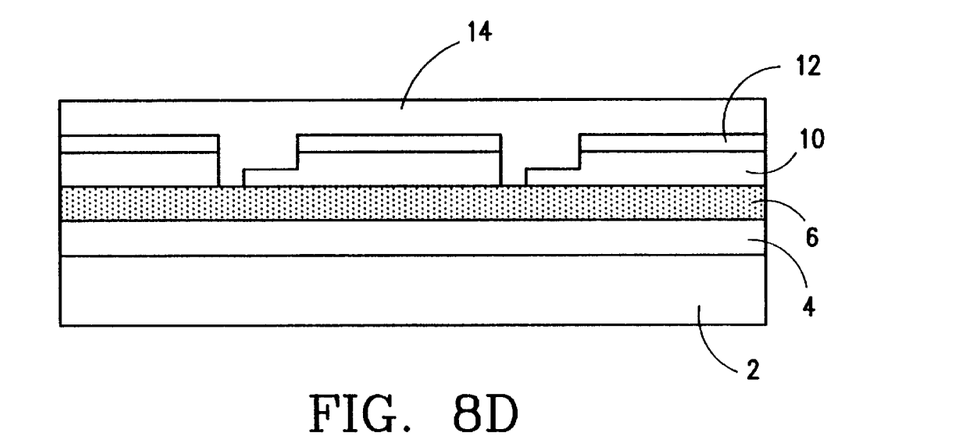

A second mask is used to photolithographically define the base contact areas 26 and etch the emitter 12 down to the base layer 10, as best shown in FIG. 8C. The insulating layer 14 is then deposited over the entire top-side of the device, as best shown in FIG. 8D.

Figure 8E:
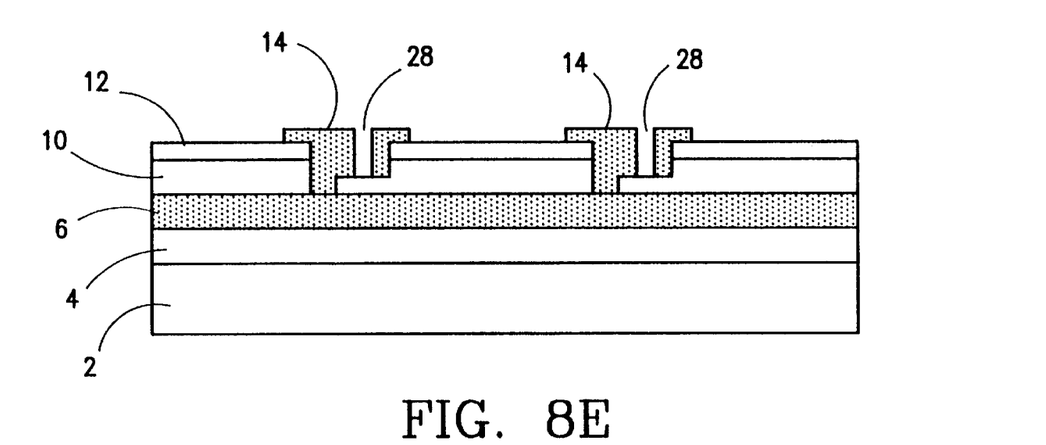

A third mask (not shown) is used to photolithographically define contact hole areas 28 above both the base and emitter regions and etch the insulating layer 14 down to the base layer 10, as best shown in FIG. 8E.

Figure 8F:
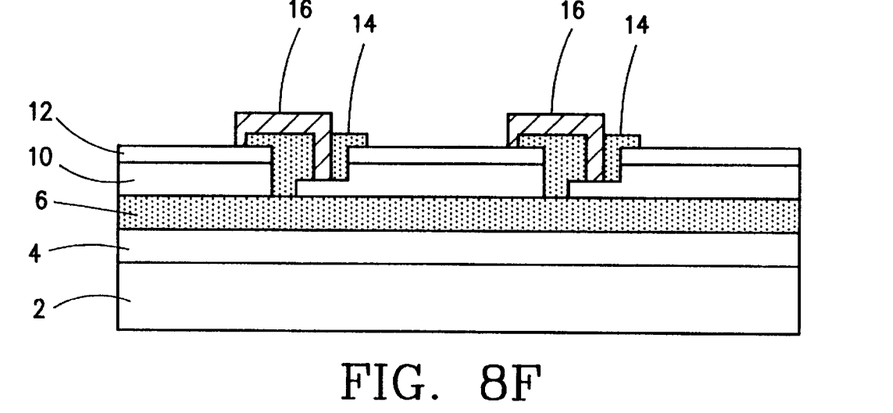
Figure 8G:
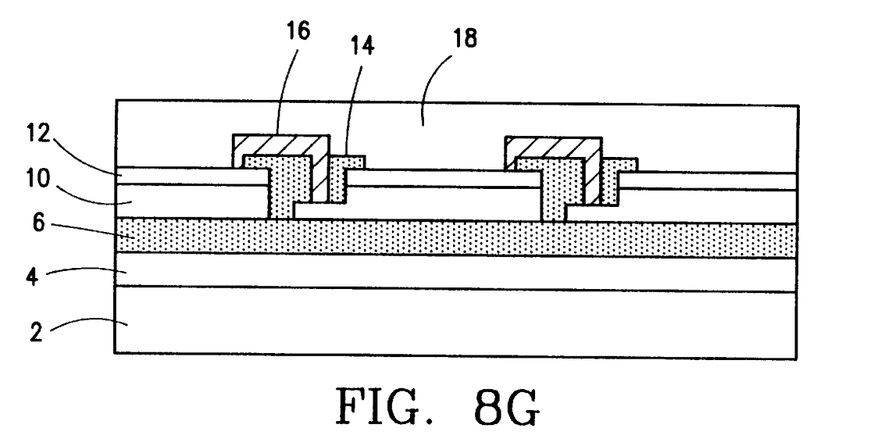
Figure 8H:
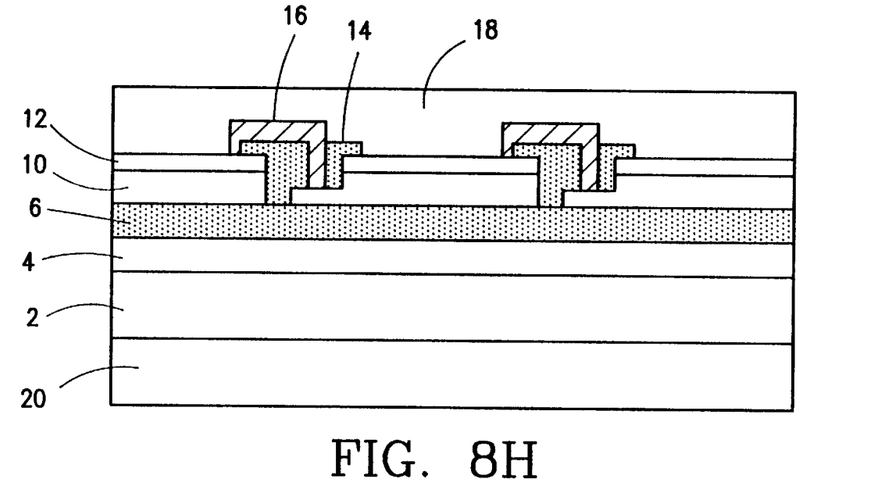

A fourth mask (not shown) is used to photolithographically define the top-side metal areas and perform a metal lift-off process to define the series interconnections 16, as best shown in FIG. 8F. The front-surface spectral control device 18 is glued or directly deposited onto the front-side or back-side of the device, depending on whether the device is illuminated from the front-side or back-side, as best shown in FIG. 8G. If a back surface reflector 20 is used, it is deposited onto the back-side of the device, as shown in FIG. 8H.

The variable current-voltage TPV device R can thus be fabricated, with the same photolithographic depositions and etching techniques utilized by the microelectronics industry. These technologies are applicable to all the substrate and active layer material systems used for the device. However, for the TPV device R, the active layers (emitter 12 and base 10) must be electrically isolated from the supporting substrate 2 to allow the interconnection of the base of one cell to the emitter of the adjacent cell without the adjacent cells being shunted together. Electrical isolation may be accomplished with an insulating substrate, such as glass or $Al_2O_3$, semi-insulating semiconductor substrate, such as InP or GaAs, wide bandgap semi-insulating epitaxial layers on a non-insulating substrate or built-in heterojunction barriers on a non-isolating substrate that prevents current flow between the active areas and the substrate.

Depending on the individual cell width, and the overall device size, various current-voltage combinations can be chosen. For example, for a 1 $cm^2$ overall device footprint with an individual cell current density of 4 $A/cm^2$ and an individual cell open circuit voltage of 0.3 V, the output current and voltage can vary by dividing the cell into multiple smaller cells as follows:

| Cell Width ($\mu$m) | Cell Subdivisions | Output Current (mA) | Output Voltage (V) |
|---|---|---|---|
| 50 | 200 | 20 | 60 |
| 100 | 100 | 40 | 30 |
| 200 | 50 | 80 | 15 |
| 500 | 20 | 200 | 6 |

The maximum cell width is limited to the series resistance of an individual cell, while the minimum cell width is limited by tolerable active vs. inactive areas (FIG. 1).

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A front-surface illuminated thermophotovoltaic device, comprising:

a) a single crystal support substrate;

b) single crystal isolation layers disposed on said support substrate;

c) a plurality of single crystal thermophotovoltaic cells disposed on said isolation layers, each of said cells including a single crystal base layer and a single crystal emitter layer;

d) an insulating member disposed between each of said cells configured to isolate each cell from adjacent cells;

e) an ohmic contact configured to connect each cell to another cell in series; and f) a spectral control device disposed on top of said cells.

2. A thermophotovoltaic device as in claim 1, wherein:

a) said support substrate is selected from the group consisting of InP, GaAs, GaSb, Si, and InAs.

3. A thermophotovoltaic device as in claim 1, wherein:

a) said isolation layers are wide bandgap semi-insulating epitaxial layers selected from: AlInPAs, AlInGaAs, AlInAsSb, AlGaInSb and AlGaAsSb.

4. A thermophotovoltaic device as in claim 1, wherein:

a) said isolation layers are heterojunction barriers comprising any two materials selected from:

AlGaInSb, AlInPAs, AlInAsSb, AlInGaAs and AlGaAsSb.

5. A thermophotovoltaic device as in claim 1, wherein:

a) said base and emitter layers are selected from the group consisting of InGaAs, InGaAsSb, InGaSb, InPAs, GaSb, and InAsPSb.

6. A thermophotovoltaic device as in claim 1, wherein:

a) said insulating member is selected from the group consisting of $Si_3N_4$ and $SiO_2$.

7. A thermophotovoltaic device as in claim 1, wherein:

a) said spectral control device is an interference filter.

8. A thermophotovoltaic device as in claim 1, wherein:

a) said interference filter is made from $ZnSe/ThF_2$.

9. A thermophotovoltaic device as in claim 1, and further comprising:

a) a surface reflector disposed on a bottom surface of said support substrate.

10. A thermophotovoltaic device as in claim 1, and further comprising:

a) single crystal graded layers disposed between said support substrate and said isolation layers.

11. A thermophotovoltaic device as in claim 1, wherein:

a) said graded layers are selected from: InGaAs, InGaSb, AlGaAsSb, AlInAsSb, InPAs, and AlInSb.

12. The thermophotovoltaic device as claimed in claim 1 wherein said single crystal support substrate is a conducting material.

13. The thermophotovoltaic device as claimed in claim 1 wherein the total thickness of said emitter layer and said base layer together is less than 10 microns.

14. A back-surface illuminated thermophotovoltaic device, comprising:
   a) a single crystal support substrate;
   b) single crystal isolation layers disposed on said support substrate;
   c) a plurality of single crystal thermophotovoltaic cells disposed on said isolation layers, each of said cells including a single crystal base layer and a single crystal emitter layer;
   d) an insulating member disposed between each of said cells configured to isolate each cell from adjacent cells;
   e) an ohmic contact configured to connect each cell to another cell in series; and
   f) a spectral control device disposed on a bottom surface of said support substrate.

15. A thermophotovoltaic device as in claim 14, wherein:
   a) said spectral control device is an interference filter.

16. A thermophotovoltaic device as in claim 14, wherein:
   a) said interference filter is made from $ZnSe/ThF_2$.

17. A thermophotovoltaic device as in claim 14, and further comprising:
   a) a surface reflector disposed on top of said cells; and
   b) said surface reflector functions as said ohmic contact.

18. A thermophotovoltaic device as in claim 14, and further comprising:
   a) single crystal graded layers disposed between said support substrate and said isolation layers.

19. A thermophotovoltaic device as in claim 14, wherein:
   a) said isolation layers are heterojunction barriers comprising any two materials selected from: AlGaInSb, AlInPAs, AlInAsSb, AlInGaAs and AlGaAsSb.

20. A thermophotovoltaic device as in claim 14, wherein:
   a) said base and emitter layers are selected from the group consisting of InGaAs, InGaAsSb, InGaSb, InPAs, GaSb, and InAsPSb.

21. A thermophotovoltaic device as in claim 14, wherein:
   a) said insulating member is selected from the group consisting of $Si_3N_4$ and $SiO_2$.

22. A thermophotovoltaic device, comprising:
   a) a single crystal substrate of GaSb;
   b) isolation layers of AlGaAsSb disposed on said substrate;
   c) a plurality of thermophotovoltaic cells disposed on said isolation layers, each of said cells including a base layer and an emitter layer, wherein said base layer is made of InGaAsSb, and said emitter layer is made of InGaAsSb;
   d) an insulating member disposed between each of said cells configured to isolate each cell from adjacent cells;
   e) an ohmic contact confined to connect each cell to another cell in series; and
   f) wherein said emitter layer, base layer and isolation layers are single crystal layers.

23. A thermophotovoltaic device as in claim 22, wherein:
   a) said emitter layer, base layer and isolation layers are epitaxially grown.

\* \* \* \* \*